United States Patent [19]

Werner

[11] 3,756,521

[45] Sept. 4, 1973

[54] WINDING DEVICE FOR RECORDING AND/OR PLAY-BACK APPARATUS

[75] Inventor: Franz Werner, Vienna, Austria

[73] Assignee: U.S. Philips Corporation, New York, N.Y.

[22] Filed: Apr. 26, 1971

[21] Appl. No.: 137,532

[30] Foreign Application Priority Data

Apr. 27, 1970 Austria .................................... 3820

[52] U.S. Cl. ................ 242/200, 242/68.3, 242/194, 242/201

[51] Int. Cl. ....................... G11b 23/10, G11b 15/32

[58] Field of Search ................... 242/68.3, 199, 200, 242/198, 197, 194, 193, 201, 202, 203, 204

[56] References Cited

UNITED STATES PATENTS 1,813,990 7/1931 De Vry ............................ 242/68.3

3,408,017 10/1968 Hashimoto ........................ 242/200

3,625,455 12/1971 Streets .............................. 242/199

*Primary Examiner*—George F. Mautz

*Attorney*—Frank R. Trifari

[57] ABSTRACT

A winding device for tape transducing apparatus, comprising a reel hub, having radially, outwardly extending projections, and a reel core provided with a central bore having radially, inwardly extending projections. The projections of said hub and bore cooperate with one another by means of driving surfaces which are inclined in the winding direction with respect to a plane extending at right angles to the axis of the hub and bore respectively.

10 Claims, 8 Drawing Figures

Figure 1:
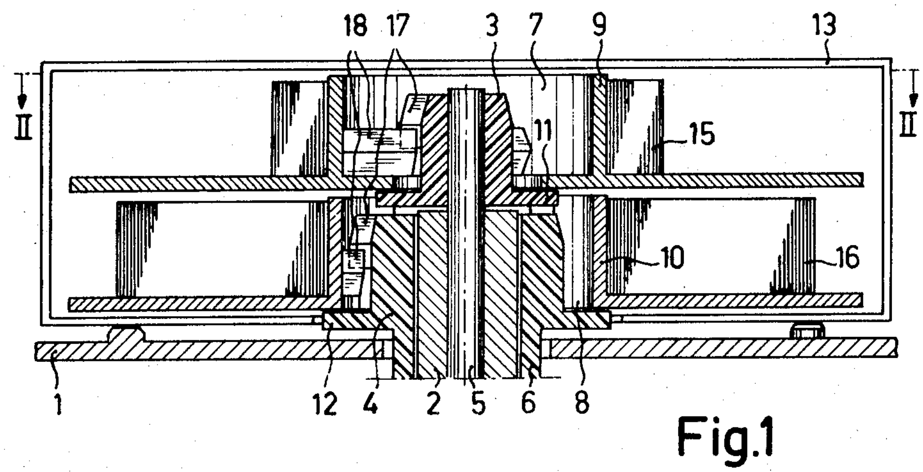

INVENTOR.
FRANZ WERNER

BY

Frank R. Jeffar [signature]
Agent

INVENTOR.
FRANZ WERNER

BY

Frank R. Trifari
Agent

WINDING DEVICE FOR RECORDING AND/OR PLAY-BACK APPARATUS

The invention relates to a winding device for a recording and/or play-back apparatus. The device has a reel hub on which is placed a reel core which rests on a supporting surface. The core carries a tape-shaped record carrier and has a central bore for receiving the hub. Dog-like projections are provided on the circumference of the hub and on the inner surface of the bore of the core which engage with one another for driving the core. The invention further relates to a winding core for use in a winding device according to the invention.

In known winding devices of the aforementioned type the dog-like projections on the winding hub may comprise three blades mutually displaced by 120° and the dog-like projections on the winding core may comprise three protruding parts likewise mutually displaced by 120°. Each pair of adjacent parts forms a slot, and when a core is placed on a hub the blades enter these slots. In such devices, the core rests on a supporting surface, which may be in the form of a turntable secured to the hub or, in the case of cores accommodated in cassettes, may be formed by a main surface of the cassette. The weight of the core with the amount of tape wound on it causes the core to engage the supportins surface.

According to the invention, the dog-like projections have driving surfaces which, when the core is driven by the hub engage one another along a tangential plane which forms an acute angle with the supporting surface for the core, and which has a component of direction which is in the same direction as the vector of the angular velocity of the hub. This ensures that the engagement of the core on the supporting surface is not only determined by the weight of the winding core together with the amount of tape wound on it, but that in addition a force component which is normal to supporting surface acts on the winding core so as to urge it against the supporting surface. This provides a perfectly secure engagement of the core on the supporting surface, which results in particularly uniform running of the tape, and this, as is known, is of particular importance for high-quality recording and play-back and hitherto has been obtainable only by providing the turntable with complicated devices for clamping the cores.

In order to obtain accurately defined force components it has proved of advantage for the driving surfaces on the dog-like projections of the hub and/or of the core to be plane surfaces. In this connection it has further proved of advantage for each of the dog-like projections on the hub and/or the core to have two driving surfaces which are mirror images of one another with respect to a plane containing the axis of the hub and form a wedge, so that secure engagement of the core with the supporting surface is ensured in both directions of rotation. Furthermore, it has been found to be particularly advantageous for the dog-like projections to have rhombus-shaped cross-sections, since this enables the core to be placed on the hub in almost any orientation.

It has been found that a very simple construction is obtained when the dog-like projections on the hub and/or the core are formed by cylindrical extensions which may be tapered towards their free ends, the dog-like projections on the core being spaced from the supporting surface by a smaller distance than are the dog-like projections on the hub.

Particularly satisfactory running of the tape is obtained when the surface for supporting the core is formed by a turn-table secured to the hub.

For cores accommodated in cassettes it has also proved of advantage for the surface supporting the core to be one of the main surfaces of the cassette.

In one preferred form of the invention, the dog-like projection, which radially protrudes into a central bore of a core has at least one driving surface for cooperation with a reel hub, which is inclined in the winding direction with respect to a plane extending at right angles to the axis of the bore. Preferably, the dog-like projections has a cross-section in the form of a rhombus.

Figure 2:
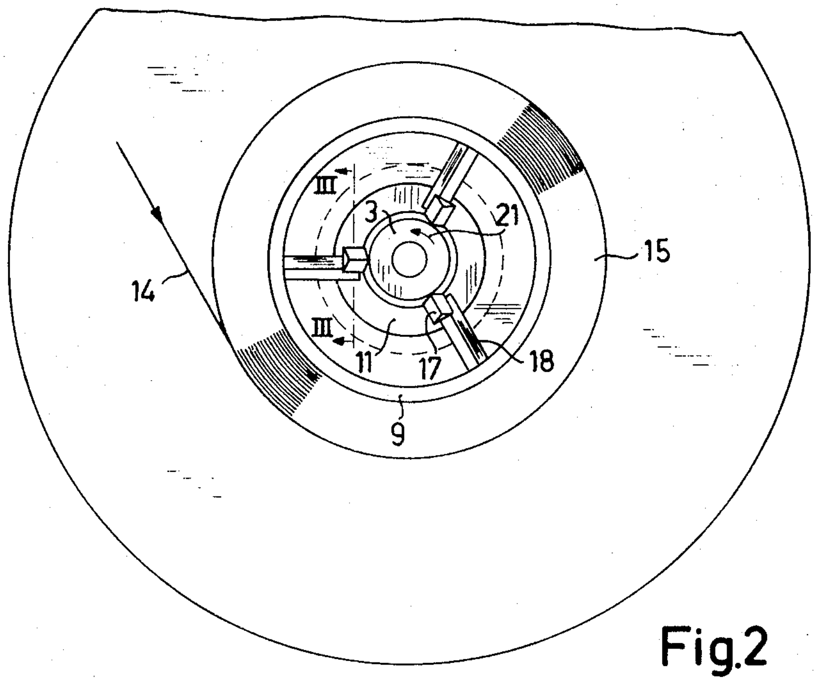
Figure 3:
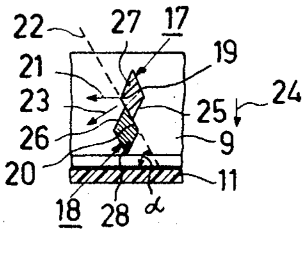
Figure 4:
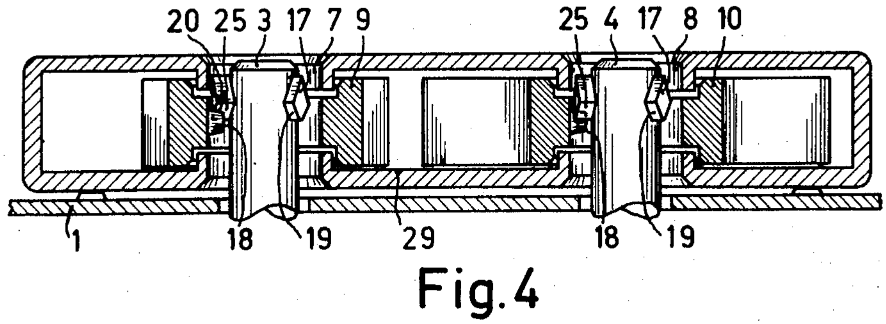
Figure 5:
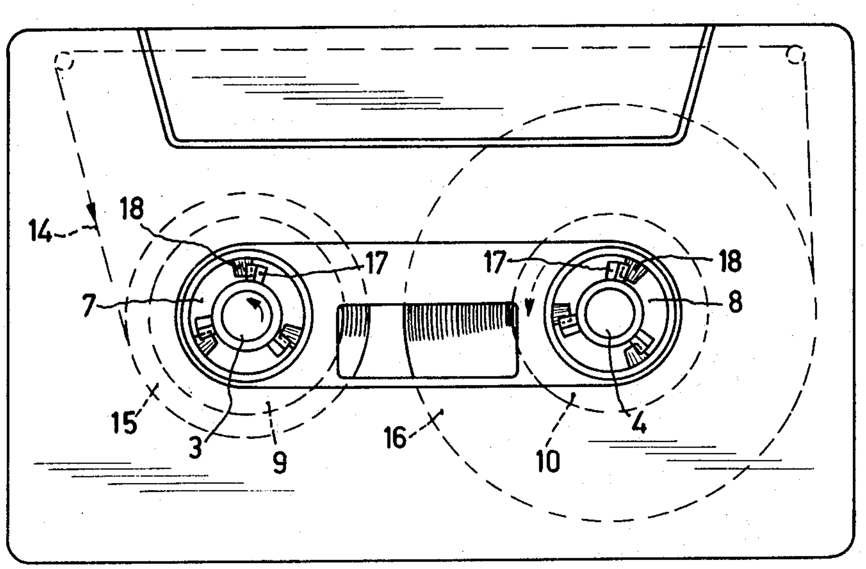
Figure 6:
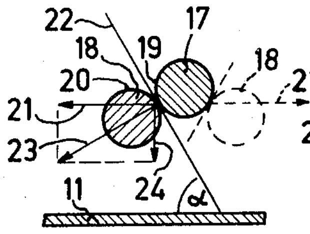
Figure 7:
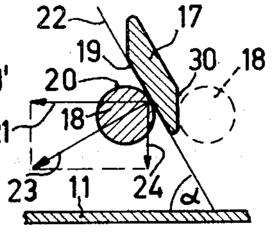
Figure 8:
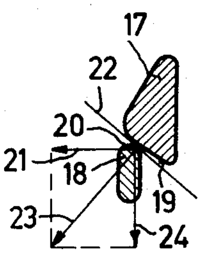

Embodiments of the invention will now be described, by way of example, with reference to the accompanying diagrammatic drawings, in which:

FIG. 1 is a longitudinal sectional view of a first embodiment using coaxially arranged hubs and cores mounted one on top of the other, FIG. 2 is a sectional view taken on the line II—II of FIG. 1, FIG. 3 shows in more detail the dog-like projections, FIG. 4 is a longitudinal sectional view of a second embodiment using hubs and cores arranged side by side, FIG. 5 is a top plan view of this embodiment, and FIGS. 6 to 8 show further embodiments of the dog-like projections.

Referring now to FIG. 1, reference numeral 1 denotes the panel of a recording and/or play-back apparatus from which protrudes a part 2 which is fixedly secured to the apparatus and serves as a bearing for hubs 3 and 4. The hubs 3 and 4 are arranged coaxially with one another, the hub 3 being secured to a shaft 5 mounted for rotation in the part 2, whilst the hub 4 is secured to a hollow shaft 6 encircling the part 2. Since the drive for the hubs is not essential to the invention, it is not shown; it is effected through the shaft 5 and the hollow shaft 6. The hubs 3 and 4 are at different levels relative to the panel 1, the radius of the hub 3 being smaller than that of the hub 4, so that on each hub there may be placed a core 9 and 10 respectively which each have a central bore 7 and 8 respectively; when mounted the cores are coaxially arranged one on top of the other and rest on supporting surfaces 11 and 12 respectively in the form of turntables provided on the hubs. As is indicated schematically, in this embodiment the two cores are accommodated in a cassette 13; in principle the cores may be mounted by themselves on the hubs. A tape-shaped record carrier 14 travels from one core to the other in a manner not shown in the Figure, passing over magnetic heads and forming reels 15 and 16 on the cores.

To enable the cores 9 and 10 to be driven by the respective hub 3 and 4, projections 17 and 18 which engage with one another after the fashion of dogs are formed on the circumference of each hub and on the inner surface of the bore of each core. According to the invention the dog-like projections 17 and 18 of a winding device have driving surfaces 19 and 20 respectively which, when a core is driven by a hub, engage one another along a tangential plane 22, which forms an acute angle $\alpha$ with the supporting surfaces 11 and 12 for the cores. The plane 22 has a directional component in the same direction as the direction of a vector 21 of the angular velocity of the hub. Each of the two winding devices has three such dog-like projections, which are mutually displaced by 120°, both on the hub and on the core; previously another number of dog-like projections may be provided. Thus, a rotating hub by means of its driving surface 19 exerts a force on the driving surfaces 20 of the core driven by it, the vector of this force extending in the direction of an arrow 23 at right angles to the tangential plane 22. This force has a first component which acts in the direction of the vector 21 and a second component which acts in the direction of the arrow 24 pointing towards the supporting surface for the core. The first component causes the core to be driven by the hub, whilst the second component according to the invention ensures a perfect engagement of the core with its supporting surface, which results in particularly uniform running of the tape. The plane driving surfaces ensure a highly satisfactory and accurately defined power transmission.

In this embodiment the dog-like projections 17 and 18 have cross-sections in the form of a rhombus. As a result there are formed, in addition to the driving surfaces 19 and 20, further driving surfaces 25 and 26 which are the mirror images of the first-mentioned surfaces with respect to a plane containing the axis of the hub and the axis of the bore in the core respectively, and which, when the direction of rotation of the hub is reversed, ensure that the winding device operates in the same manner as described hereinbefore. If the driving surfaces 19,25 and 20,26 which form wedges, are inclined at different angles to the supporting surface 11, force components for urging the core to the supporting surface are obtainable which have different values in the two directions of rotation.

The operation according to the invention in both directions of rotation is independent of the fact whether the hub is the driving part or the core drives the hub, which may be the case when a tape is wound from a core whilst the hub is not driven but rotates freely.

The rhombus-shaped cross-sectional shape of the dog-like parts has the additional advantage that further wedges 27 and 28 are formed which always ensure that the cores are readily and securely placed on the hubs, for if, when a core is placed on a hub, the dog-like projections on the core should strike the dog-like projections on the hub, these parts 27 and 28 ensure that the projections on the core can slide past the projections on the hub, permitting in this case also the core to assume its operative position.

In the embodiment shown in FIGS. 4 and 5, two cores 9 and 10 are in known manner accommodated side by side in a cassette 13, a main surface 29 of the cassette serving as the supporting surface. In this embodiment, the hubs 3 and 4 are constituted by spindle ends protruding from the upper wall 1 of the apparatus. Similarly to the embodiment shown in FIGS. 1 to 3, the dog-like projections 17 on the hubs have rhombus-shaped cross-sections. The dog-like projections 18 in the bores 7 and 8 of the cores are constituted by cylindrical tapering protruding parts having substantially the form of truncated cones. In the projection 17 the driving surfaces again take the form of plane surface 19 and 25, whereas in the projections 18 the driving surfaces 20 are curved and are simply constituted by the surfaces of the protruding parts. When the core is driven by the hub, the driving surfaces engage one another in a tangential plane defined by the surfaces 29 and 25. When the protruding parts 18 are arranged in a large-diameter bore, they need not be shaped in the form of cones, since in this case the surfaces 19 and 25 will readily and efficiently cooperate with a right-cylindrical surface 20.

The operation of this winding device is similar to that described with reference to the embodiment shown in FIGS. 1 to 3. If the record carrier 14 is wound around the core 9 in the manner shown schematically in FIG. 5, the hub 3, which in this case is the driving member, ensures a sliding engagement of the core 9 with the main surface 29 of the cassette, so that the record carrier runs uniformly and is wound into a perfect flat reel 15. At the supply side, with the hub 4 not being driven, the core 10 drives this hub, and owing to the wedge effect exerted by the driving surfaces of the projections of the hub on the driving surfaces of the projections on the core, the latter is also caused to slidingly engage the main surface 29 of the cassette. This ensures that the record carrier is uniformly drawn from this core. Further, the friction between the core 10 and the main surface 29 produces a braking force which acts as a counter drag and in known manner stabilizes the running of the record carrier. If required, the hub 4 may be additionally braked. Obviously, a driven winding device may be used at the supply side also.

In the embodiment shown in FIG. 6, both the projections 17 on the hub and the projections 18 on the core are cylindrical, while the latter projections are located closer to the supporting surface 11 of the core embodiment, are the former. In this embodiment both the driving surface 20 and the driving surface 19 are curved, the tangential plane 22 at the point of contact of the surfaces being inclined at an angle $\alpha$ to the supporting surface 11. This winding device also acts in both winding directions 21 and 21', according to the invention.

In the embodiment shown in FIG. 7, the projection 17 on the hub is in the form of a protruding part of parallelogram-shaped cross-section, one surface, the driving surface 19, being inclined to the supporting surface 11, whilst another surface 30 is at right angles thereto. The projection 18 again is cylindrical. This winding device operates according to the invention in the direction of rotation 21 only. In the reverse direction of rotation the surface 30, which is not inclined to the supporting surface 11, cooperates with the projection 18, so that, as will be seen from the Figure, no force component is produced which urges the core to the supporting surface 11.

FIG. 8 shows an embodiment similar to that shown in FIG. 7, but in which the projections 17 are triangular in cross-section and the projections 18 are oval in cross-section.

As will be appreciated, many modifications of the embodiments described are possible without departing from the scope of the invention. This applies in particular to the shapes of the driving surfaces, which may be plane or curved or even spherical, and to the inclination of the tangential plane at the point of contact.

What is claimed is:

1. A winding device for use in a recording and/or playback apparatus comprising a supporting surface, a reel hub for mounting on a part of said apparatus, a reel core for carrying a tape shaped record carrier supported by said supporting surface and carried by said reel hub, said reel core having a central bore through which said reel hub is extended, a plurality of dog-like projections protruding from the circumference of said reel hub, and a like number of dog-like projections extending from the inner surface of the bore of said reel core, said dog-like projections on said reel hub and said dog-like projections on said reel core arranged for driving engagement with each other, each of said dog-like projections having a driving surface which are in contact with each other when said projections are engaged, said driving surfaces lying-in a plane tangent to the point of contact betwen them, said plane forming an acute angle with said supporting surface when said projections are in engagement such that when said reel core is driven by said reel hub said tangential plane forming said acute angle with the supporting plane will have a directional component in the same direction as the vector of angular velocity of the reel hub.

2. The winding device according to claim 1, wherein the driving surface of the dog-like projections of the hub and the driving surface of the dog-like projections of the core are flat surfaces.

3. The winding device according to claim 2, wherein each of the dog-like projections on the reel hub have two driving surfaces, each of which are mirror images of the other with respect to a plane containing the axis of said hub, and each of the dog-like projections on the reel core have two driving surfaces, each of which are mirror images of the other with respect to a plane containing the axis of said reel core, said two driving surfaces of each dog-like projection forming a wedge.

4. The winding device according to claim 3, wherein the dog-like projections have rhombus-shaped cross-sections.

5. The winding device according to claim 1, wherein the dog-like projections on the hub and on the core are cylindrical extensions, said dog-like projections on the core being spaced from said supporting surface by a distance smaller than the dog-like projections on the hub.

6. The winding device according to claim 5 wherein said cylindrical extension forming said dog-like projections are tapped toward their full ends thus forming truncated cones.

7. The winding device according to claim 1 wherein said supporting surface for said reel core is a turntable secured to the reel hub.

8. The winding device according to claim 1 further comprising a cassette for housing said winding device, said supporting surface for the core being one of the main surfaces of said cassette.

9. A reel core for use in a winding device for carrying thereabout a tape-shaped record carrier comprising a central bore to be mounted on a hub of the winding device, and at least one dog-like projection radially protruding into said central bore, at least one driving surface provided on said projection for cooperation with said hub, said driving surface being inclined in the direction of winding with respect to a plane extending at right angles to the axis of the bore.

10. The reel core according to claim 9, wherein said projection has a rhombus-shaped cross-section.

* * * * *

Disclaimer 3,756,521.—*Franz Werner*, Vienna, Austria. WINDING DEVICE FOR RECORDING AND/OR PLAY-BACK APPARATUS. Patent dated Sept. 4, 1973. Disclaimer filed Nov. 26, 1974, by the assignee, *U.S. Philips Corporation.*

Hereby enters this disclaimer to claims 1, 7, 8, 9 and 10 of said patent.

[*Official Gazette June 10, 1975.*]